United States Patent
Paintmayer et al.

(10) Patent No.: US 8,857,555 B2
(45) Date of Patent: Oct. 14, 2014

(54) FRONT WHEEL SUSPENSION ON A TWO-TRACK VEHICLE

(71) Applicant: Bayerische Motoren Werke Aktiengesellschaft, Munich (DE)

(72) Inventors: Peter Paintmayer, Munich (DE); Bernd Binkowski, Munich (DE); Stephan Ertlmaier, Ismaning (DE); Anton Woelfl, Munich (DE); Kurt Poetter, Munich (DE); Benjamin Jakob, Munich (DE); Farshad Boromandi, Munich (DE); Franz Hoiss, Bernried (DE); Ana Fernandez, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/797,476

(22) Filed: Mar. 12, 2013

(65) Prior Publication Data
US 2013/0241166 A1    Sep. 19, 2013

(30) Foreign Application Priority Data

Mar. 14, 2012  (DE) .......................... 10 2012 204 032

(51) Int. Cl.
| | | |
|---|---|---|
| B62D 21/00 | (2006.01) |
| B60R 19/00 | (2006.01) |
| B60G 7/02 | (2006.01) |
| B60G 3/02 | (2006.01) |
| B62D 21/15 | (2006.01) |

(52) U.S. Cl.
CPC ................ B60G 3/02 (2013.01); B62D 21/155 (2013.01); B60G 7/02 (2013.01); *B60G 2206/016* (2013.01); *B60G 2204/143* (2013.01)
USPC .... 180/274; 280/784; 280/748; 280/124.125; 296/187.09

(58) Field of Classification Search
CPC ...... B60G 7/02; B60G 3/02; B60G 2206/016; B60G 2204/143; B62D 21/055; B60R 19/00; B60R 2021/0004; B60R 2021/0023
USPC ................... 280/784, 124.125, 124.128, 748; 296/187.09, 187.1; 180/274
See application file for complete search history.

(56) References Cited

U.S. PATENT DOCUMENTS 4,090,721 A * 5/1978 Wedin et al. .................. 280/834
5,845,938 A * 12/1998 Kato ............................. 280/784
(Continued)

FOREIGN PATENT DOCUMENTS

DE    38 00 944 C1    1/1989
DE    37 10 892 C2    7/1989
(Continued)

OTHER PUBLICATIONS

German Search Report dated Oct. 26, 2012 w/ partial English translation (ten (10) pages).

*Primary Examiner* — Ruth Ilan
(74) *Attorney, Agent, or Firm* — Crowell & Moring LLP

(57) ABSTRACT

A front wheel suspension on a two-track vehicle having a wheel carrier or pivot bearing guided by an articulated suspension link is provided with an add-on part arranged such that during an impact of the vehicle on an obstacle which penetrates into the space bridged by the suspension link between a wheel and an axle support or vehicle body, the add-on part forms a lever arm on an articulated connection of the suspension link to separate the link by opening or destroying the connection. Separation of the articulated connection allows the vehicle wheel to be displaced laterally away from the vehicle interior. The add-on part may be fastened by a fastening screw of the articulation connection or be an extension of the screw. The add-on part may have a bead or a punch ring which has a destructive effect on the articulated connection during impact-caused displacement of the add-on part.

11 Claims, 4 Drawing Sheets

(56) References Cited

U.S. PATENT DOCUMENTS

| | | |
|---|---|---|
| 6,478,106 B2 | 11/2002 | Hawener et al. |
| 6,994,374 B2 * | 2/2006 | Miyasaka .................. 280/784 |
| 7,571,917 B2 | 8/2009 | Ruehe et al. |
| 7,832,748 B2 * | 11/2010 | Cariou et al. .......... 280/124.109 |
| 2002/0180171 A1 * | 12/2002 | Hasebe et al. ......... 280/124.134 |
| 2003/0090099 A1 * | 5/2003 | Miyasaka ................ 280/784 |
| 2004/0200347 A1 * | 10/2004 | Grosch ..................... 89/36.09 |

FOREIGN PATENT DOCUMENTS

| | | |
|---|---|---|
| DE | 195 42 496 C1 | 10/1996 |
| DE | 41 42 587 C2 | 4/2000 |
| DE | 100 31 165 C2 | 4/2002 |
| DE | 10 2004 015 048 A1 | 10/2005 |
| DE | 10 2005 033 810 A1 | 1/2007 |
| DE | 10 2008 015 182 A1 | 9/2009 |
| EP | 0 098 401 A1 | 1/1984 |

* cited by examiner

FRONT WHEEL SUSPENSION ON A TWO-TRACK VEHICLE

CROSS REFERENCE TO RELATED APPLICATION

This application claims priority under 35 U.S.C. §119 from German Patent Application No. 10 2012 204 032.3, filed Mar. 14, 2012, the entire disclosure of which is herein expressly incorporated by reference.

BACKGROUND AND SUMMARY OF THE INVENTION

The invention relates to a front wheel suspension on a two-track vehicle. The front wheel suspension includes a wheel carrier or pivot bearing guided by at least one suspension link in each case connected by way of an articulated connection with the wheel carrier and an axle support or the vehicle body. The suspension is arranged such that during a deformation of the front wheel suspension as a result of an impact of the vehicle on an obstacle, in which there is a further impact-caused deformation of the vehicle front section, the wheel is displaced away from the vehicle interior toward the longitudinal side of the vehicle, wherein the deformation of the front wheel suspension is triggered when the obstacle or, another object caused by the obstacle penetrates into the vehicle front section into the space bridged by the suspension link and extending in the longitudinal direction of the vehicle toward the front between two articulated connections of the suspension link. With respect to the state of the art, reference is made particularly to German Patent Document DE 195 42 496 C1, in addition to German Patent Documents DE 10 2008 015 182 A1 or DE 37 10 892 C2.

It is basically endeavored to make the design of a vehicle, for example, a passenger car, as safe as possible, particularly also for the event of an accident, i.e. when the vehicle impacts on an obstacle. In order to minimize the risk of injury to vehicle occupants in the event of such an impact, the vehicle parts (=the vehicle front section) situated in front of the vehicle interior viewed in the driving direction, if possible, should not penetrate into the vehicle interior as a result of this impact. With respect to the front wheels of the vehicle, the above-mentioned German Patent Document DE 195 42 496 C1 suggests such a design of the wheel-guiding suspension links that, in the event of a so-called offset impact, i.e. when the vehicle impacts onto an obstacle with its corner region, the wheel is pivoted laterally to the outside. For achieving this, a rear control arm strut can be longitudinally deformed, i.e. shortened in an energy-absorbing manner.

A special case of the offset impact is an impact with little overlap, i.e. with an obstacle that is narrow in relation to the width of the vehicle, which impact may be particularly critical when the obstacle penetrates into the vehicle front section without thereby striking the actual crash structure of the vehicle which, in the case of conventional passenger cars is formed by an axle support or an engine mount. When, as a result of the impact, such an object penetrates into the space between a front axle support and the or a front wheel of the vehicle (passenger car), this could possibly affect the suspension of this wheel such that the wheel has the tendency to be shifted toward the longitudinal axis of the vehicle, which may lead to unfavorable deformations with respect to an intrusion into the vehicle interior. In contrast, it is desirable that, as a result of an impact, the wheel ideally is displaced in a straight line in the direction of the door sill of the vehicle body.

It is an object of the present invention to indicate a remedial measure for the described problems.

For a front-wheel suspension of a two-track vehicle having a wheel carrier or pivot bearing guided by at least one suspension link, this object is achieved in that, on or in the region of the front wheel suspension, an add-on part, i.e. a suspension link separating device is provided which projects into the above-mentioned space bridged by the suspension link and extending toward the front, the add-on part being displaced by the impacting obstacle or by the above-mentioned other object such that, as a result, at least one of the articulated connections is opened or destroyed and the suspension link is thereby exposed with respect to the axle support or the wheel carrier. Advantageous embodiments and further developments are the content of the subclaims.

First, the concept of the space will be briefly discussed that extends in the longitudinal direction of the vehicle toward the front between the wheel carrier (=pivot bearing) and the axle support (=front axle support) or the vehicle body or that region of the vehicle body to which the above-mentioned suspension link is fastened by way of the articulated connection, and which is bridged by the suspension link. This space can be described approximately as a rectangle in a perpendicular projection onto the road on which the vehicle is moving, with a certain extent in the transverse direction of the vehicle and an extent in the longitudinal direction of the vehicle which is larger than the extent in the transverse direction. Viewed in the transverse direction of the vehicle, this space is quasi bridged by the above-mentioned suspension link.

According to the invention, an add-on part projects into the above-mentioned space in the region or starting from the region of one of the two articulated connections of the suspension link. The add-on part, in the case of a corresponding impact on an obstacle with little overlap whose negative consequences are to be reduced or minimized by the present invention, ensures that the wheel is partially released from its wheel suspension in that the above-mentioned articulated connection is separated. For this purpose, the obstacle or another object has to impact on the add-on part; whereupon the latter causes the desired separation of the articulated connection, for example, by way of a lever arm formed by the add-on part. As a result, in the course of the further impact-caused deformation of the vehicle front section, the wheel can be displaced away from the vehicle interior laterally toward the outside, i.e. toward the respective longitudinal side of the vehicle adjoining the wheel. This "partial freeing" of the wheel suspension is implemented by detaching the or a suitable wheel-guiding suspension link, in which case the separating of its articulated connection can take place by opening or destroying the articulated connection. In this case, the articulated connection can basically be opened or destroyed between this suspension link and the wheel carrier or pivot bearing at which the (steerable) vehicle front wheel is disposed, or the articulated connection can be opened or destroyed or, in other words, be interrupted or broken open, thus generally "separated", between the above-mentioned suspension link and the front axle support or the vehicle body to which the suspension link is hinged by way of an articulated connection.

In this context, it is explicitly pointed out that by no means that obstacle on which the vehicle first impacts, for example, in the form of a pole, has to be the object that penetrates into the above-mentioned space bridged by the suspension link and impacts there on the add-on part according to the invention. On the contrary, the last-mentioned object impacting on the add-on part according to the invention may have been directly or even indirectly caused by the above-mentioned object to impact on the add-on part.

Viewed in the driving direction of the vehicle, the add-on part according to the invention will normally be situated in front of the suspension link to be separated from its articulated connection, which suspension link acts as a hinged tie bar when the articulated connection is operable. Normally, an axle support is provided so that the add-on part projects into the space between the axle support and the wheel. In view of the installation space conditions, it is then recommended to separate the articulated connection between the above-mentioned wheel-guiding suspension link and the axle support by the add-on part according to the invention when an obstacle with little overlap penetrates into the space between the axle support and the wheel and thereby impacts on this add-on part. By this separating or breaking-open of the articulated connection, the above-mentioned suspension link will be exposed with respect to the axle support and, in the course of the further impact-caused deformation, the wheel can shift, as desired, toward the facing longitudinal side of the vehicle.

The add-on part according to the invention may be fastened to different locations. It is only important that, in the event of an impact of the vehicle on an obstacle, whereupon this obstacle or another object penetrates into the above-mentioned space, this add-on part is displaced such that the articulated connection of the suspension link adjacent to the add-on part is separated, i.e. opened or destroyed. In a preferred embodiment, the add-on part can be fastened by way of the, or a fastening screw of, the articulated connection to the articulated connection, in which case the articulation of the articulated connection may be constructed as such, for example, as an elastomeric bearing or rubber bearing, whose interior is penetrated in a known manner by the above-mentioned fastening screw. In this embodiment, the fastening screw can be torn off by way of the lever arm formed by the add-on part with an impact-caused displacement of the add-on part, and the articulated connection can thereby be separated. As an alternative or in addition, the add-on part can be shaped such that, with the above-mentioned displacement, it destroys components of this articulated connection essential for the supporting function of the articulated connection, which explicitly includes not only the articulation as such but also that section of the wheel carrier or axle support or vehicle body at which the articulation of the articulated connection is preferably separably fastened. For example, the add-on part may have a co-called bead or a punch ring or generally a suitably shaped cutting edge, which, in the case of an impact-caused displacement of the add-on part, acts in a destructive manner upon the articulated connection, particularly on a receiving device at the axle support for a an elastomeric bearing forming the articulation, or the like.

According to an alternative embodiment, the add-on part of the invention may be formed by an extension of the above-mentioned fastening screw of the articulated connection. This fastening screw can, for example, be constructed to be so stiff that the impact impulse of the obstacle (or of the above-mentioned other object) is introduced in a virtually unbiased manner as a transverse force into the articulated connection, whereupon the articulated connection is broken open and, as a result, the suspension link is released or exposed as desired.

According to a further embodiment, the add-on part may, however, also be fastened or linked laterally of the articulated connection, for example, to the axle support and have a wedge surface, on which the obstacle or the above-mentioned other object impacts as a result of the collision, i.e. during its progression. When this add-on part is arranged in a suitable manner, this object or the obstacle can then, during the progression of the impact, which lasts until the vehicle has stopped, slide along the wedge surface or the like in such a manner that, again by way of a lever effect, this add-on part will be displaced such that it has a destructive effect on the above-mentioned articulated connection.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
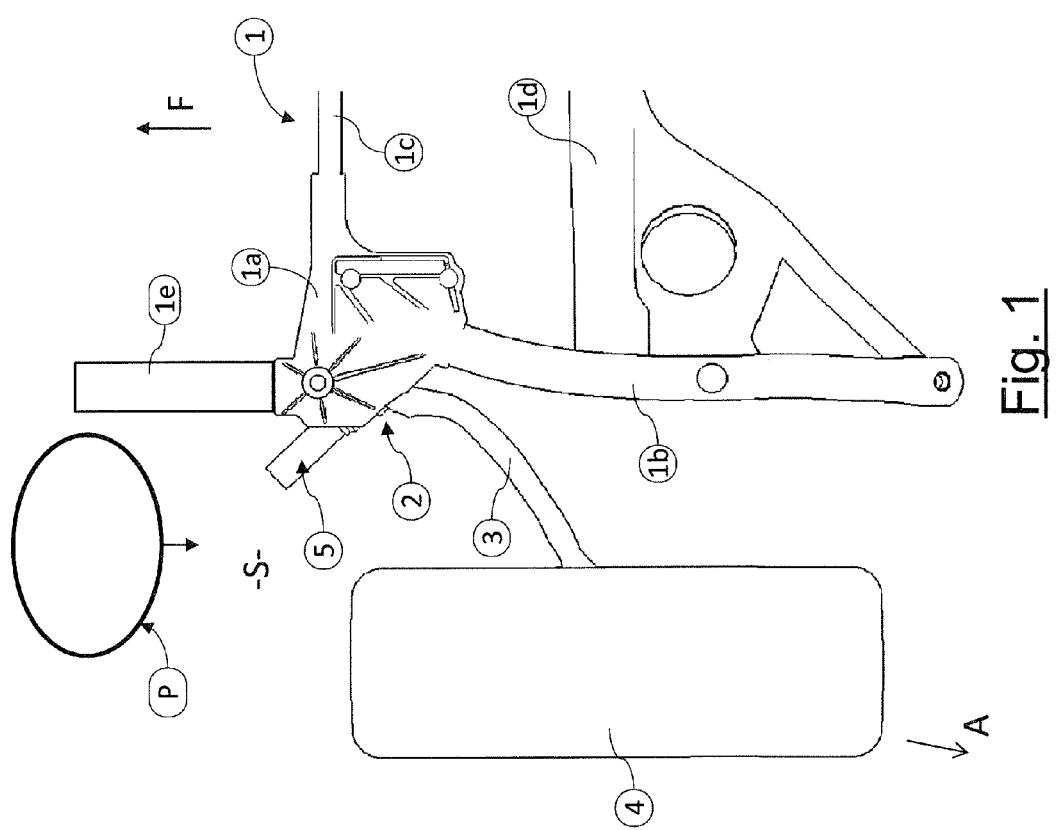
FIG. 1 is a top view (perpendicular projection onto the road) of the essential part of a first front wheel suspension according to the invention in the region of the left front wheel of a passenger car.

Referring first to the first embodiment and thereby to FIG. 1, reference number 1a marks the left-hand side front gusset of an only partially illustrated front-axle support 1 of a passenger car. Further components of this front axle support 1 shown only in a fragmentary fashion in the figure or abstractly are a side member 1b, a transverse tube 1c, a cross member 1d as well as a deformation element 1e which, viewed in the driving direction F, is situated in front of the gusset 1a and quasi clamped in between this gusset 1a as well as the not shown bumper of the vehicle, which deformation element 1e, in any case, in the event of an impact with a broader overlap, i.e. when the vehicle impacts frontally on a broader obstacle, absorbs a portion of the impact energy.

By way of an articulated connection 2, a wheel-guiding suspension link 3, which acts here as a hinged tie bar, is hinged to the gusset 1a of the front axle support 1. With its other end, this suspension link 3 is also by way of a not shown articulated connection linked to the wheel carrier 4 of this wheel 4, which wheel carrier 4 is situated at the vehicle front wheel 4 quasi within the left-hand side vehicle front wheel 4 and is therefore not visible in FIG. 1. As illustrated particularly in FIG. 3, the articulated connection 2 between the suspension link 3 and the front axle support 1 is formed by an elastomeric bearing 2a pressed into a receiving device in the suspension link 3 as well as by so-called joint plates 2b in the or on the gusset 1a of the front axle support 1 and a fastening screw 2c, by which the elastomeric bearing 2a is fastened in a known manner to the joint plates 2b.

Figure 3:
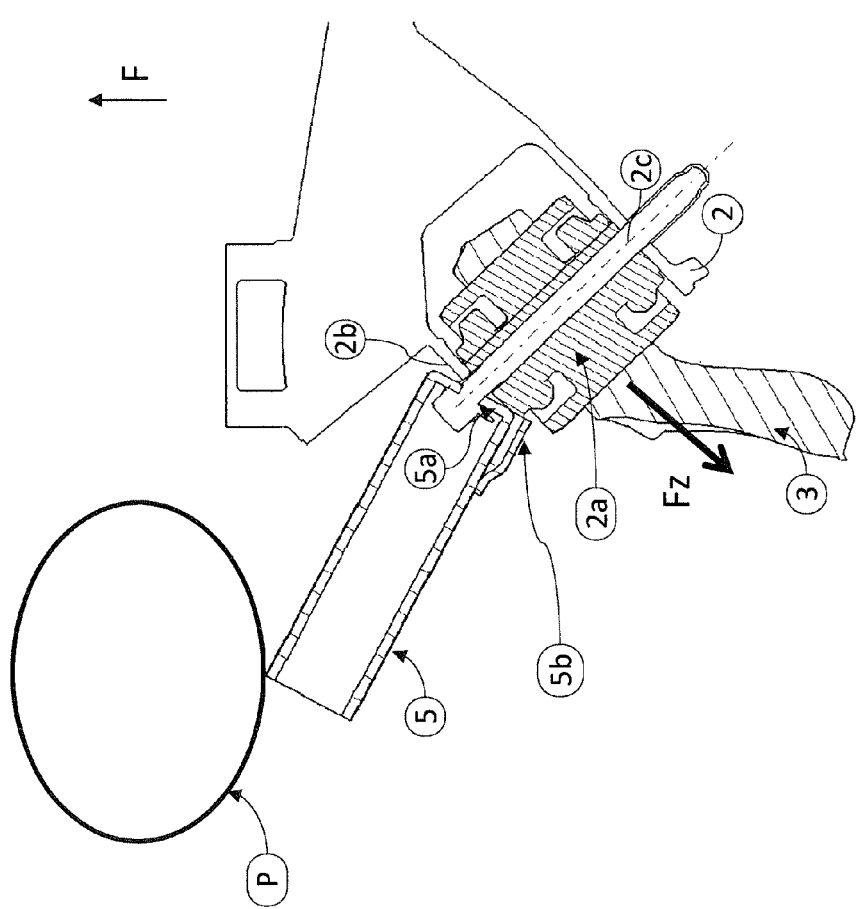
FIG. 3 is a view of the effect of this add-on part in the event of an impact-caused displacement.

Additionally, an add-on element 5 is provided on this articulated connection 2, which add-on element 5 is in this case constructed in a tube shape, and—as especially indicated in FIG. 1—projects into the space S between the front axle support 1 or this articulated connection and the wheel 4. In the present embodiment, this tube-shaped add-on element 5, which has a certain stiffness sufficient for its function explained in the following, is fastened by the above-explained fastening screw 2c to the articulated connection 2. As illustrated in FIG. 3, the tube-shaped add-on part 5 has a floor or an end wall 5a at least at its end facing the articulated connection 2, in which floor or end wall 5a a passage bore for the fastening screw 2c is provided which is dimensioned such that the add-on part 2c is pressed like a washer by the screw head against the facing joint plate 2b of the front axle support 1.

In FIGS. 1, 3, the letter P abstractly indicates an obstacle, which is narrow compared with the width of the vehicle and on which the add-on part 5 will impact when the vehicle and therefore its front axle support 1 moves slightly farther in the driving direction F. This obstacle P may expressly be formed by a component of a larger not shown obstacle on which the vehicle has impacted just prior to that time in the course of its drive in the driving direction F, and whereupon this component P of the obstacle has penetrated in the front section of the vehicle. However, in an extreme case, this obstacle P may also be formed by a component of the vehicle itself which, as a result of an impact of the vehicle upon another obstacle, was deformed and displaced such that this component impacts as obstacle P onto the add-on part when the front axle support 1 moves slightly farther in the driving direction F. (In this context, "another object" is mentioned in the claims as well as before the description of the figures).

Figure 2:
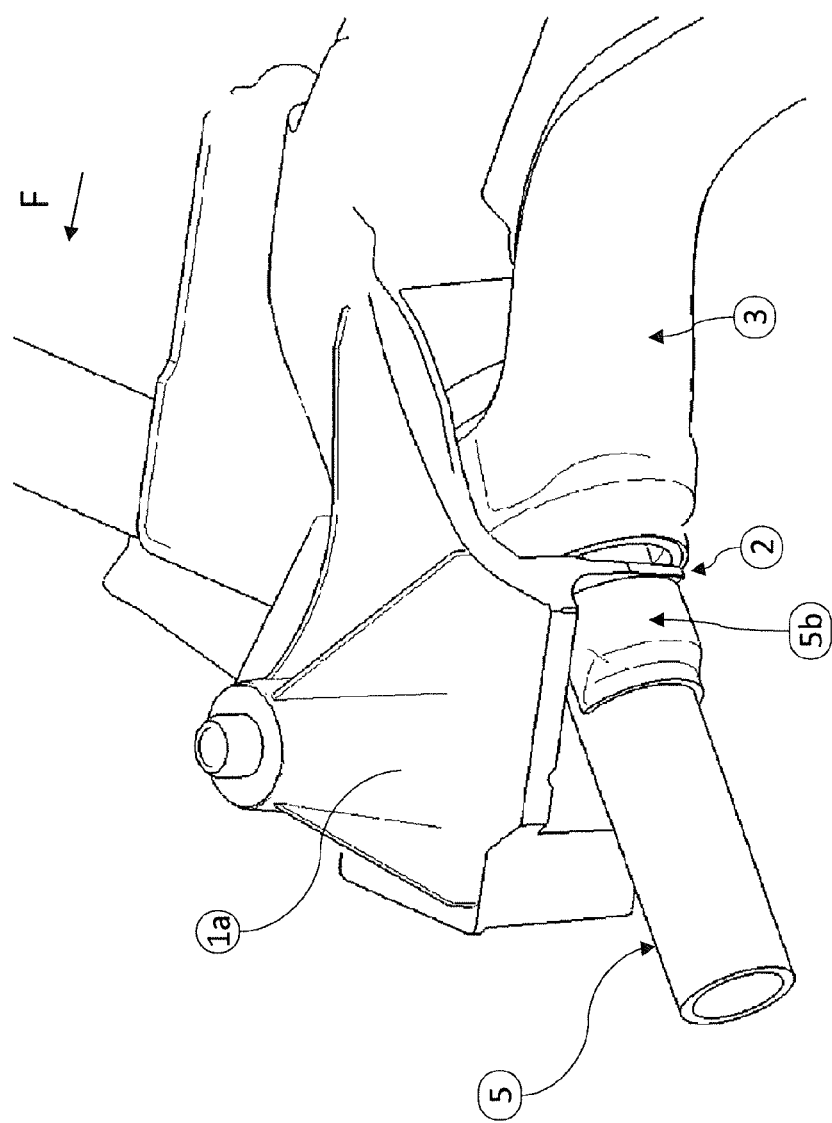
FIG. 2 is a perspective view particularly of the add-on part fastened to the articulated connection between the suspension link and the axle support.

When the obstacle P impacts on the add-on part 5, this add-on part 5 will be displaced with its free end with respect to the position illustrated in FIG. 1 against the direction of the arrow F, as basically illustrated or initially illustrated in FIG. 3. FIG. 2 also indicates that a so-called bead 5b is provided on the exterior side, in the end section of the add-on part 5 facing the articulated connection 2, that is, in the present case, on the cylinder jacket surface of this add-on part 5 representing a hollow cylinder. With the just mentioned displacement of the add-on part 5—in which case, the latter in the representation of FIG. 3 is rotated quasi around the passage opening in the end wall 5a as a center of motion—by way of the lever arm formed by this add-on part with respect to this above-mentioned center of motion, this bead 5b can destroy the joint plate 2b as a result of the impact impulse of this obstacle P. In addition, the fastening screw 2c or its head can in this case be torn off the shaft. Independently of what concretely takes place in which sequence as a result of such an impact-caused displacement of the add-on part 5, the articulated connection 2 is thereby destroyed in any case. Consequently, the suspension link 2 can detach from the articulated connection 2, and the wheel 4, which is also guided by this suspension link 3 when the articulated connection 2 is intact, as a result of the separation of this articulated suspension 2, obtains a further degree of freedom, whereby the wheel 4 (with the wheel carrier) is permitted to move out of the way approximately in the direction of the arrow A in FIG. 1 toward the longitudinal side of the vehicle not shown in detail.

Figure 4:
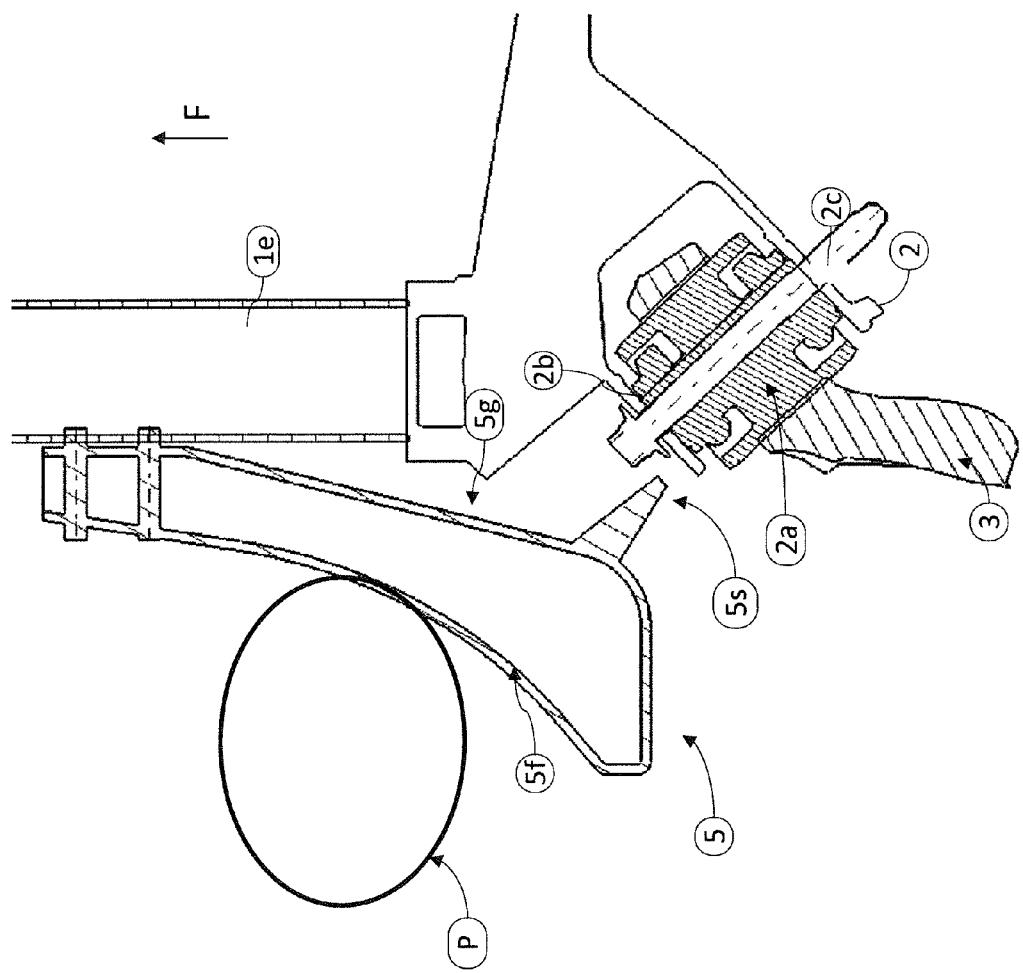
FIG. 4 is a view similar to FIG. 1 of a second embodiment.

The same effect is achieved in the case of the now explained second embodiment according to FIG. 4. In this FIG. 4, the same elements as in the first embodiment are marked by identical reference numbers. In particular, an add-on part 5 is also provided here, which in the present case has the basic shape of a wheel chock, by which parked vehicles, especially trailers, are secured against a rolling-away. This add-on part 5 therefore has a wedge-shaped sloped surface 5f as well as, situated opposite the latter on the so-called base area 5g, one or two cutting edges 5s which, as a result of the suitable arrangement of the add-on part 5, faces the articulated connection 2 to be separated in the event of an impact with little overlap. As illustrated, in the present case, the add-on part 5 is linked, by way of its region situated opposite the cutting edges 5s and thus in the front in the driving direction F, to the deformation element 1e in such a fashion that, when the obstacle P impacts on this sloped surface 5f and slides along on it, as long as the vehicle is still slightly moving in the driving direction F in the time progression of the impact, the add-on part 5 with the cutting edges 5s is pivoted so impulsively toward the articulated connection 2 that this articulated connection 2 is destroyed as desired and is thereby opened up.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A front wheel suspension on a two-track vehicle, comprising:
   at least one of a wheel carrier and a pivot bearing;
   at least one suspension link arranged to guide the at least one of the wheel carrier and the pivot bearing by way of two articulated connections with the at least one of the wheel carrier and the pivot bearing and at least one of an axle support and a body of the two-track vehicle; and
   a suspension link separating device,
   wherein the suspension link separating device is arranged to separate the at least one suspension link to displace a wheel carried by the at least one of the wheel carrier and the pivot bearing away from an interior of the vehicle toward a longitudinal side of the vehicle when an impact of the vehicle on an obstacle causes at least one of the obstacle and another object to penetrate into a vehicle front section space bridged by the at least one suspension link and extending in the longitudinal direction of the vehicle front between the two articulated connections of the at least one suspension link and contact the suspension link separating device.

2. The front wheel suspension according to claim 1, wherein the suspension link separating device is arranged at one of the two articulated connections such that the suspension link separating device is pivotally displaced by the at least one of the obstacle and another object and the pivoting of the suspension link separating device causes the one of the two articulated connections to separate.

3. The front wheel suspension according to claim 2, wherein the suspension link separating device is at least one of fastened on the articulated connection by a fastening screw of the articulated connection and formed by an extension of the fastening screw that projects into said vehicle front section space.

4. The front wheel suspension according to claim 3, wherein the suspension link separating device is tube-shaped.

5. The front wheel suspension according to claim 3, wherein the suspension link separating device has at least one of a bead, a cutting edge and a punch ring that facilitates separation of the articulated connection during displacement of the suspension link separating device during the impact.

6. The front wheel suspension according to claim 2, wherein the suspension link separating device is tube-shaped.

7. The front wheel suspension according to claim 2, wherein the suspension link separating device is provided with a wedge-shaped sloped surface arranged such that during the impact the at least one of the obstacle and another object slides along the sloped surface the suspension link separating device is displaced in a manner which causes the articulated connection to separate.

8. The front wheel suspension according to claim 2, wherein the suspension link separating device has at least one of a bead, a cutting edge and a punch ring that facilitates separation of the articulated connection during displacement of the suspension link separating device during the impact.

9. The front wheel suspension according to claim 1, wherein the suspension link separating device is tube-shaped.

10. The front wheel suspension according to claim 1, wherein the suspension link separating device is provided with a wedge-shaped sloped surface arranged such that during the impact the at least one of the obstacle and another object slides along the sloped surface the suspension link separating device is displaced in a manner which causes the articulated connection to separate.

11. The front wheel suspension according to claim 1, wherein the suspension link separating device has at least one of a bead, a cutting edge and a punch ring that facilitates separation of the articulated connection during displacement of the suspension link separating device during the impact.

* * * * *